United States Patent Office 3,232,698
Patented Feb. 1, 1966

3,232,698
METHOD FOR PREPARING BORON COMPOUNDS
Frank C. Gunderloy, Jr., Menlo Park, N.J., assignor to Esso Research and Engineering Company, a corporation of Delaware
No Drawing. Filed Nov. 14, 1960, Ser. No. 69,213
4 Claims. (Cl. 23—14)

The present application is a continuation-in-part of U.S. patent application Serial No. 855,468, filed November 25, 1959, which is a continuation-in-part of U.S. patent application Serial No. 820,823, filed June 15, 1959. Said application Serial No. 820,823 is now abandoned.

The present invention relates to a method of preparing hydrazine diborane, $N_2H_4 \cdot 2BH_3$, a useful solid rocket propellant, of enhanced thermal stability by using steps for eliminating moisture and/or rendering any moisture unreactive in the system.

Solid monopropellants that are stable at ambient temperatures are highly desirable as thrust producers in the motors of pure rockets which do not use the surrounding atmosphere for supplying a fuel oxidizer. Storage stability of such propellants over long periods of time is desirable, particularly to have the motors ready for immediate use. The term "monopropellant" as used herein means a substance which does not need any other substance to bring about the release of its thermal chemical energy with formation of gases and evolution of heat.

The synthesis of hydrazine diborane, using hydrazine salts and borohydrides, is exemplified by the reaction:

$$N_2H_4 \cdot H_2SO_4 + 2NaBH_4 \rightarrow N_2H_4 \cdot 2BH_3 + 2H_2 + Na_2SO_4$$

In carrying out this reaction, since the reactants are generally solids, it is desirable to employ a suitable inert liquid diluent or solvent to facilitate the reaction and the separation of the resulting products.

It has been found, in accordance with the present invention, that the hydrazine diborane product can be given improved thermal stability by using steps for eliminating moisture and for rendering the moisture innocuous or unreactive, as for example, using the following modifications of the reaction: Treatment of the reagents to remove traces of water prior to the reaction, use of a dehydrating material, e.g. anhydrous sodium sulfate in the reaction mixture, and use of a significant excess of the hydrazine salt over the stoichiometric proportion e.g. 1% to about 20%. Combinations of these modifications can be used for increased advantages. For example, improved thermal stability of the hydrazine diborane is obtained in using the excess of the hydrazine salt, free of water, using the borohydride reactant, free of water, and a suitable diluent that is free of water. In addition, to insure that any traces of water are rendered unreactive, the anhydrous salt may be added prior to or during the reaction. Other drying agents which may be used are calcium chloride, calcium sulfate, alumina, calcium hydride and magnesium sulfate.

In general, the hydrazine diborane is prepared by reacting an ionic hydrazine compound with an ionic borohydride in the presence of a suitable solvent.

Preferably, the synthesis of the hydrazine diborane is carried out by contacting the hydrazine salt with a metal borohydride under convenient reaction conditions in the range of −80° C. to about the melting point, 260° C. of the hydrazine diborane, the reaction being conveniently carried out in the liquid phase. The hydrazine reactant is a compound which contains a diprotic hydrazinium ion $(N_2H_6^{++})$ whose primary valence is ionically bonded to a negative ion or anion, herein indicated by X. Hydrazine reactants coming within the purview of this invention have the formula:

$$X_n(N_2H_6^{++})_m$$

wherein X is one or more organic or inorganic anions; H and N are hydrogen and nitrogen, respectively; $n$ is an integer of 1 to 2 and is the number of anions needed to balance the formula, i.e. it is 1 when X is a divalent anion and 2 when X is monovalent; and $m$ is an integer of 1 for a dibasic salt. If the anion is monovalent, e.g. bromide, then $n$ is 2 and $m$ is 1; if it is divalent, e.g. sulfate, then $n$ is 1 and $m$ is 1. The anion X is generally a nonmetallic ion, such as acetate, formate, carbamate, phosphite, phosphate, azide, nitrite, nitrate, sulfate, chlorate, perchlorate, butyrate, laurate, oxalate, glutarate, cyanate, thiocyanate and halide, e.g. chloride and bromide. The organic anions may be mono- or polycarboxylic acid radicals having 1 to 16 carbon atoms. The lower molecular weight, e.g. $C_1$ to $C_4$, saturated acids are preferred. Examples of specific hydrazine compounds coming within the scope of the above formula are: hydrazine dihydrochloride, hydrazine diacetate, hydrazine diformate, hydrazine diphosphate, hydrazine dinitrate, hydrazine dichlorate, hydrazine diperchlorate, hydrazine dicyanate, hydrazine dihydrobromide and hydrazine sulfate.

The borohydride reactant may be any stable salt, such as a metal borohydride or a nitrogen-containing borohydride. The preferred metal borohydrides are the alkali metal borohydrides, such as sodium, lithium or potassium borohydride. Other metal borohydrides, such as aluminum or the alkaline earth metals, e.g. calcium and magnesium, can be used. Quaternary ammonium salts, such as the tetra-alkyl ammonium borohydrides, e.g. tetraethyl or tetramethyl ammonium borohydride, are also satisfactory. The preferred reactants are sodium borohydride and hydrazine sulfate or hydrazine dibromide because of the high yields they produce within a relatively short time.

Since the reactants are generally solids, it is desirable to employ an inert liquid diluent to facilitate handling the reactants and afford better contact in the reaction zone. It is sometimes advantageous to admix one or both reactants with diluent before introducing them to the reaction zone where they are intimately contacted by means of an efficient stirring device. The diluent should not contain any functional groups which react either with the reactants or the desired product, except, of course, where it promotes the reaction in some manner. Among the common inert organic diluents that may be used are $C_5$ to $C_{10}$ hydrocarbons such as, pentane, benzene, heptane, nonane and hexane, halides such as carbon tetrachloride, chloroform and perfluoropentane, acids such as acetic acid, esters, such as ethyl acetate, amides such as dimethyl formamide, acetals such as methylal, and nitriles such as acetonitrile. Carbonyl compounds, i.e. aldehydes and ketones, and alcohols are usually not satisfactory diluents. The preferred diluents are 5 or 6 member cyclic ethers, such as tetrahydrofuran, dihydropyran and dioxan, because they are solvents for the hydrazine diborane product. These solvents facilitate the separation of the product from the reaction mixture because the non-gaseous by-products are often insoluble in these ethers. Thus, by using organic cyclic ethers, separation can be accomplished by filtration and evaporation of the solvent. Moreover, in a continuous process, the cyclic ether can be continuously removed from the reaction zone, flashed or distilled from the product and recycled to the reactor. The amount of diluent used in the reaction mixture is not critical. Of course, a substantial quantity, e.g. 50 to 99.5 wt. percent should be present in the reaction zone to permit easy handling of the reactants. Where the diluent is not a selective solvent for the product, separation may be achieved by distilling or filtering off the diluent and recovering the hydrazine boranes from the residue by sublimation. Any other separation techniques known in the art may also be employed, such as selective extraction and evaporation of the solvent.

The reaction conditions are not critical, and therefore, the temperatures and pressures employed are governed by the economics of the particular process. Ambient temperatures and atmospheric pressure are suitable conditions for carrying out the reaction. However, temperatures in the range of 0° to 30° C. or 45° C. and pressures between about 10 mm. and 1 atmosphere or slightly higher have been found to be quite satisfactory. Care must be taken at the higher temperatures to avoid degradation of the desired reaction product. Thus while higher temperatures reduce reaction time, they are usually accompanied by other things which may be more injurious than the benefits derived by their use. At room temperature or lower the reaction is generally carried out for a period ranging up to about 10 days, e.g. several hours to 5 days. The reaction commences almost immediately upon contacting the reactants as is evidenced by the evolution of hydrogen from the reaction mixture. The hydrogen may be recovered and used in other chemical processes such as the hydrogenation of aldehydes to form alcohols.

The atmosphere in the reaction zone must be inert in order to avoid product degradation. Inert gases, such as nitrogen, helium and argon, may be employed to flush out the reactor at the beginning of the run. Thereafter these gases may be circulated through the reactor to remove any hydrogen formed therein during the reaction.

It is important to avoid contamination of the components in reaction mixture with ethyl ether since this substance has a deleterious effect on the hydrazine boranes made by this process. Moreover, this ether should not be used to purify the product because it will degrade it and render it useless as a high energy monopropellant. It is usually advisable to carry out the process in the absence of acyclic ethers.

The hydrazine diborane prepared in accordance with the process described herein is highly stable at room temperature (25° C.) and is only slightly sensitive to impact or friction. It has the empirical formula $B_2N_2H_{10}$ and is believed to have the following structure:

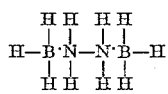

in which there are coordinate bonds between the nitrogen and boron atoms. The product has no detectable melting point up to 260° C. It has a specific impulse of 286 sec. $^{-1}$ and when admixed with fuels, such as boron or aluminum, higher specific impulses are obtained.

The hydrazine diborane prepared in accordance with the present invention can be compounded with conventional materials used in solid rocket propellant systems, such as binders or adhesive substances. Because this monopropellant possesses an unusually low flame temperature, 1500 to 2000° K., it is especially suited for use in end burning rockets. End burning grains allow a more efficient use of the volume of the rocket case, and impose fewer mechanical (structural) limitations on the propellant. It is also useful as a coolant in rocket propellant mixtures which normally burn at high temperatures. If desired, an oxidizing agent, such as fluorine, can be included in the propellant mixture to change the combustion characteristics of the borane. The diborane may also be used in many chemical reactions as a reducing agent, e.g. in the preparation of oximes.

The following examples show how the hydrazine diborane of improved stability is prepared:

*Example 1*

Both hydrazine sulfate, $N_2H_4 \cdot H_2SO_4$ and sodium borohydride, $NaBH_4$ of commercial grade are available in large quantities. They are relatively stable salts but tend to contain some moisture. Taking the commercial grade of these salts and heating them to a temperature of 100° C. in vacuo for a period of 24 hrs., removes substantially all traces of water. The resulting dried hydrazine sulfate (24.5 g. or 0.189 mol) is contacted with 11.4 g. (0.302 mol) of the dried sodium borohydride in 150 ml. of anhydrous tetrahydrofuran as a solvent at 25° C. under atmospheric pressure. This proportion of the hydrazine salt reactant is in 25% excess of the stoichiometric proportion with respect to the sodium borohydride reactant. The resulting mixture is stirred until hydrogen evolution ceases. When the reaction is completed, as shown by the end of the hydrogen gas evolution, the sodium salt solids precipitated are removed by filtration, and pentane is added to the resulting filtrate until the hydrazine diborane is precipitated. The precipitate is filtered off and dried at room temperature in vacuo to give 7.3 gm. (81% yield) of pure hydrazine diborane (nitrogen found, 47%; calculated, 47%).

For testing the hydrazine diborane made with the anhydrous reactions, samples were kept in storage at elevated temperatures of 60° C. and higher temperatures. Less than 10% decomposition was shown by these products over a period of at least 250 hours when stored at 60° C.

*Example 2*

Repeating the method of Example 1, but without using an initial drying of the commercial grade hydrazine salt to attain removal of last traces of water, anhydrous sodium sulfate ($Na_2SO_4$) was added in a proportion of 25% with respect to the proportion of hydrazine sulfate. Again the hydrazine diborane was recovered, as in Example 1 and subjected to the elevated temperature storage test, which showed that the hydrazine diborane product showed less than 10% decomposition for over 250 hours at 60° C.

In contrast to the high stability products obtained using the method of Examples 1 and 2 for eliminating the effects of water, when moisture was permitted to be present it was found that the water catalyzed the reaction, making the same proportions of the reactants completely react to the point of no further hydrogen gas evolution in a much shorter period of time. However, the hydrazine diborane product from the water catalyzed reaction was found unsuitable, in that it showed 50% decomposition in 50 hours at 60° C.

It is not intended to restrict the present invention to the foregoing examples, but rather it should only be limited by the appended claims in which it is intended to claim all the novelty inherent in the invention. For instance with respect to utility, the hydrazine diborane can be used for many purposes other than those mentioned above. To be specific, it can be used as a detonator or it can be combusted to make hydrogen and boron nitride, both of which have numerous uses in the chemical field.

What is claimed is:

1. In a process for preparing hydrazine diborane which comprises reacting reactants consisting of a borohydride salt selected from the group consisting of alkali metal, alkaline earth metal, aluminum, and quarternary ammonium borohydride salts and a hydrazine salt containing a diprotic hydrazinum ion ($N_2H_6^{++}$) in an inert liquid diluent with evolution of hydrogen to form hydrazine diborane having the empirical formula $B_2N_2H_{10}$ and a solid by-product salt from the cation of the borohydride salt and from the anion of the hydrazine salt in the resulting reaction mixture, followed by separation of unreacted solid reactant salt and of said by-product salt from a solution of the hydrazine diborane in the diluent, and recovery of the hydrazine diborane from the diluent, the improvement which comprises maintaining the reactants and the diluent substantially free of water while the hydrazine diborane is formed and is dissolved in the diluent, and removing last traces of water by adding to said reaction mixture a drying agent.

2. In the process as defined in claim 1, said drying agent being an anhydrous salt selected from the group consisting of sodium sulfate, calcium chloride, calcium sulfate, alumina, calcium anhydride and magnesium sulfate.

3. In the process as defined in claim 1, said drying agent being anhydrous sodium sulfate which is separated with the unreacted solid reactant salt and by-product salt from the resulting solution of hydrazine diborane in the diluent.

4. In the process as defined in claim 1 in which the hydrazine salt is hydrazine sulfate mixed in excess of stoichiometric proportion with the borohydride salt.

References Cited by the Examiner
UNITED STATES PATENTS

| | | | |
|---|---|---|---|
| 2,716,052 | 8/1955 | Felger | 23—190 |
| 2,854,312 | 9/1958 | Hinkamp | 23—14 |

MAURICE A. BRINDISI, *Primary Examiner.*

ROGER L. CAMPBELL, *Examiner.*